July 14, 1936. D. F. STEDMAN 2,047,444

PACKING FOR FRACTIONATING COLUMNS AND THE LIKE

Filed Jan. 14, 1935

INVENTOR:
DONALD FRANK STEDMAN

Alex. E. MacRae
BY          ATTORNEY.

Patented July 14, 1936

2,047,444

UNITED STATES PATENT OFFICE 2,047,444

PACKING FOR FRACTIONATING COLUMNS AND THE LIKE

Donald Frank Stedman, Ottawa, Ontario, Canada

Application January 14, 1935, Serial No. 1,719

11 Claims. (Cl. 261—94)

This invention relates to packing for fractionating columns and the like, and particularly to the arrangement of capillary material to provide a column or like structure to serve as a packing in apparatus used in processes, for the separation or purification of materials, which require repeatedly obtaining equilibrium between a liquid and gas phase.

An ideal fractionating column should meet as closely as possible the following requirements, namely; descending liquid at any level should not be mixed with liquid from any other level; it should be of identical bulk composition throughout any horizontal cross-section of the column, and in any practical application it should be mixed to attain uniformity, since this ideal is never attained completely and slight irregularities of composition build up to serious proportions by repetition. Liquid at the interface, in contact with the vapour, should be mixed as rapidly as possible with the bulk of the liquid at the same level, in order to prevent accumulation of the less volatile constituents in the liquid at the interface. These factors apply in like manner to the ascending vapours. In addition the column should provide: maximum contact between liquid and vapour, including the factor of extended area, as well as that of as "active" a surface as possible; uniform distribution of both liquid and vapour throughout the available cross-section of the column, and preventation of the liquid flowing via the column wall. The column should retain a minimum amount of liquid. The column should be compact, of simple, durable and economic construction and should give a minimum of back pressure.

The object of this invention is to provide a packing which will meet all of these requirements with a maximum of efficiency and which will permit sharp, well-defined separations of the components of the materials under treatment.

The invention contemplates filling the fractionating space with a regularly disposed continuous structure of capillary material or gauze, of such a mesh that liquid being treated will completely seal the openings, while larger openings, which are not sealed by the liquid, are provided for the passage of the vapours under treatment. The capillary material is so arranged in the structure that the liquid will have a continuous path downward, and the vapor a continuous path upward, each phase without hinderance by the other, and preferably with a maximum contact between liquid and vapour. Gauze of woven wire is a satisfactory material provided the mesh openings are small enough to seal with the liquid. Mesh openings of .02 inch in their smallest dimension may permit some liquid to flow down the inside wall of the tube, but mesh openings of .01 inch are satisfactory. However, the mesh openings to be used in a particular construction will depend upon the type of liquid being treated and the amount of reflux liquid being employed. It is desirable that the wires of the gauze project above the film of reflux liquid in order to break and disturb its flow as much as possible, but without perforation of the seal. This is accomplished by using as heavy wire as is feasible for the purpose in hand. Thus the weave and wire sizes are selected when forming a column having regard to maintenance of capillarity. The capillary material may be made from fabric, asbestos, glass or slag wool, plastics or similar substances capable of acting as a wick. The acid or other character of the materials to be treated must be considered in selecting the particular capillary material to be used. Materials not sufficiently rigid in themselves require structural support to sustain the column.

The invention will now be described with reference to the accompanying drawing, in which Figure 1 is a diagrammatic plan view of a metal wire gauze shaped to a preferred pattern.

Figure 1:
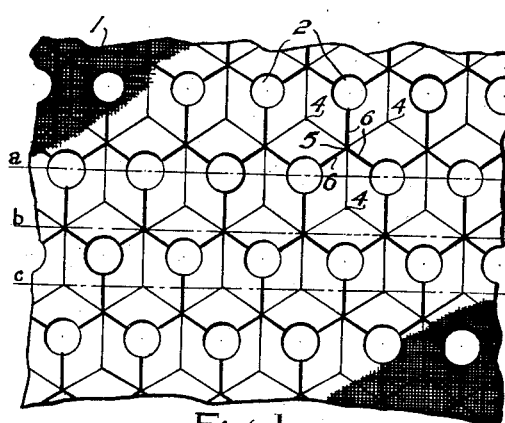
Figure 2:
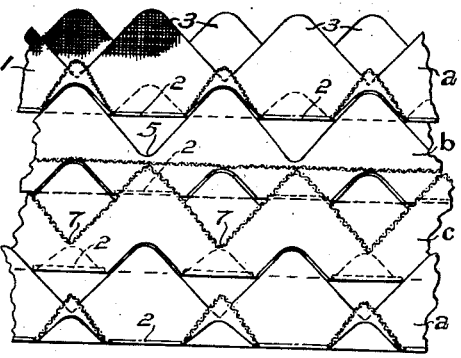
Figure 2 is an enlarged vertical section illustrative of a column of the patterned gauze of Figure 1, the sections of the successive layers in the column being as if taken on the lines a—a, b—b and c—c of Figure 1.

In the preferred form shown in Figures 1 and 2 the capillary material is metal wire gauze 1 shaped to form a regular pattern, which, apart from the vapour openings 2, is the same on both sides of the sheet. The gauze sheet is as if corrugated in three directions at 120° to each other to provide a plurality of rows of pyramidal portions 3, such portions in adjacent rows being staggered with respect to each other. The apex of the pyramid is indicated at 4, and 5 represents the meeting or junction point of three pyramids, two in one row and one in an adjacent row. What are, in effect, troughs leading from the respective vapour openings 2 are represented in heavy lines 6 in Figure 1 and in section at 7 in Figure 2. The vapour openings 2 are arranged in regular pattern and in this form are also staggered in adjacent rows, as best shown in Figure 1. When assembled to form a colum of packing, as shown in Figure 2, each of three successive individual layers a, b and c are orientated, with respect to each other, in the manner illustrated, so as to form more or less cubical cells throughout the column. For description purposes and to best illustrate the orientation of the individual layers, it will be observed that layer a is a section along line a—a of Figure 1 and layers b and c are shown as if sectioned along lines b—b and c—c, respectively, thus illustrating the respective positioning of the layers with respect to the pattern. The orientation of each member of successive groups of three layers is as just described, this grouping and orientation of the layers providing the required cells. The vapour openings 2 of one sheet are directly above the respective junction points 5 of the underlying sheet, and each perforation in one sheet is directly below a pyramid in the sheet immediately above. Each of the roughly cubical cells in the column has a vapour inlet 2 at its base and vapour outlets to a plurality of adjacent cells.

In this structure the unit cell is fed with vapour from each of three similar cells below it, the streams of vapour coming from each direction at 120° to each other along the troughs 6 and combining at the vapour inlet to the cell under consideration. This jet of vapour then passes through the cell and in passing out to adjacent cells is again divided into three equal portions flowing in a direction at 60° to the original streams. Thus in the absence of turbulence or other mixing, each of the three streams of vapour leaving each exit would come from two of the original streams, one half from each. If any turbulence exists, mixing would naturally be better still, giving in the ideal case complete mixing in each cell. Thus, owing to the regularity of the whole structure, the original distribution of the vapour is substantially uniform, and, owing to the repeated recombination, mixing and subdivision to which it is subjected throughout the packing, it is impossible for any appreciable deviation from uniformity to exist in the vapour composition at any horizontal plane in the packing. With respect to the descending liquid a somewhat similar action takes place. Each edge of each cell is a junction point for four surfaces of gauze, two from above and two from below, thus the liquid descending from the two upper surfaces is combined at the junction and re-distributed over the two lower surfaces. Mixing of the liquid occurs at the junction and as the two lower surfaces leave the junction at the same angle to the horizontal, they each carry an equal load of liquid, irrespective of the initial distribution.

In this particular pattern the vapour perforations have also a certain beneficial effect on the distribution of liquid throughout the structure in that they deflect liquid somewhat towards the top of each cubical cell, and thereby cause the liquid to pass over a maximum length of gauze surface. They also break the continuity of the junction points and prevent the liquid simply siphoning along these edges from top to bottom of the packing without properly flooding the gauze surfaces.

The specific pattern disclosed in this preferred form may be varied widely, provided the effect on the vapour and liquid is similar, producing repeated subdivision and recombination of the respective streams upward and downward. The indentations, for example, may be conical depressions and the actual pattern of these indentations may be varied greatly.

Figure 3:
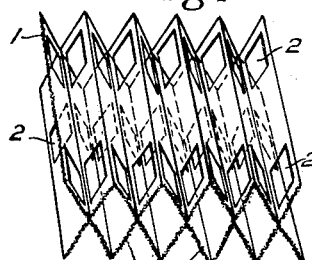
Figure 3 is a perspective view of another arrangement of the gauze.

In Figure 3 the gauze material 1 is corrugated in one direction only and the successive sheets are stacked to provide more or less diamond-shaped cells 8, elongated horizontally, the vapour openings 2 being staggered as before to cause the vapours to travel some distance longitudinally of each cell before passing to the next higher in the column. Of course, the cells need not be of the particular shape shown. They may be more or less cylindrical, or oval shape, or the like. It will also be noted that a similar structure may be provided by arranging the sheets vertically with a suitable pattern of corrugations and perforations. It will be apparent that in this type of structure the successive sheets may be stacked in such a manner that the directions of the corrugation are not parallel, giving a construction as in Figure 4. Similarly a separator, as illustrated in the latter figure, may be used.

Figure 4:
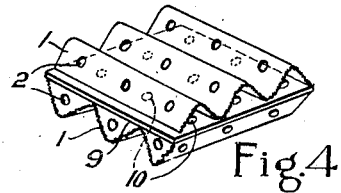
Figure 4 is a similar view of a modified arrangement.

Figure 4 illustrates a somewhat similar arrangement but with a separator sheet 9 between the corrugated sheets 1 and having vapour openings 10 therein. The separator 9 may be omitted if desired.

Figure 5:
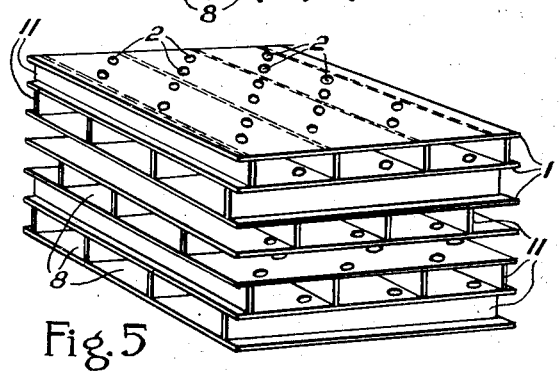
Figure 5 is a perspective view of a column of capillary material.
Figure 6:
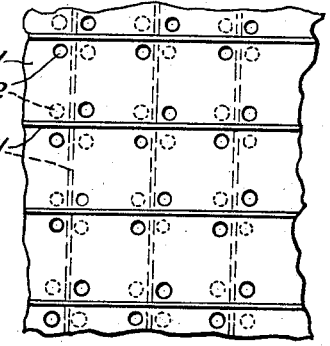
Figure 6 is a partial plan view of the column shown in Figure 5.

In Figures 5 and 6 there is illustrated an arrangement using layers or sheets 1 of capillary material, such as fibrous fabric, asbestos, glass or slag wool or other material capable of acting as a wick, and which has properties making it particularly suitable for specific applications where acid-proof or similar properties are required. The layers or sheets 1 are separated by supporting members 11, which may be strips of glass, enamelled iron or other suitable material. The spacers 11 are laid in opposite directions between adjacent pairs of the layers 1 to provide the desired arrangement of the cells 8. The layers 1 are provided with vapour perforations 2 arranged substantially as shown in Figure 6 so that each cell receives vapour from a plurality of lower cells and so that the vapour cannot escape from one cell to another without travelling longitudinally or transversely, or both, within the cell.

Figure 7:
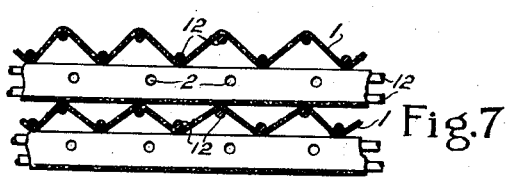
Figure 7 is a partial cross-sectional view of an alternative structure to that in Figure 5.
Figure 8:
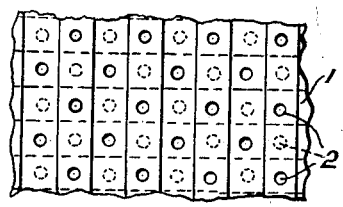
Figure 8 is a diagrammatic plan view of the structure shown in Figure 7.

Figures 7 and 8 illustrate an alternative arrangement of this sort of capillary material. The sheets 1 are corrugated to provide a cell pattern and bars 12 of any suitable material are provided as shown to retain the regular pattern of the cell structure. The sheets are provided with vapour perforations 2 as before. This structure is similar in cell pattern to that of Figure 4 without the separating sheets 9. In Figure 8 the heavy lines represent the low points of the corrugations and the light lines the high points.

In the last mentioned two forms it will be observed that the supporting bars 11 and 12 are intended to rest upon recesses, lugs, ribs or the like in or on the inner wall of the tube in which the packing is placed or they may be supported on each other.

Figure 9:
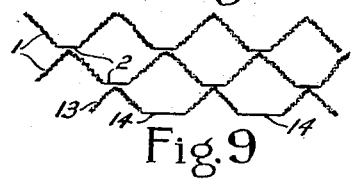
Figures 9 and 10 are diagrammatic views of drainage means for the columns.
Figure 10:
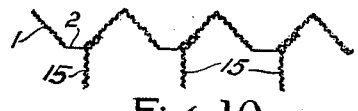

At any intermediate interruption of the cellular structure and at the bottom, in order to be able to utilize the full capacity of the column, it is desirable that some form of more or less vertical drainage means be provided, through which the rising vapour has a free passage of greater cross-section than that provided by the vapour perforations in the capillary material. This may be provided by using a bottom sheet 13 of capillary material with holes 14 therein of larger cross-section than those two in the higher sheet, as shown in Figure 9. Or as illustrated in Figure 10, vertical drainage surfaces 15 of capillary material may be attached to or made integral with the lower portion of a section of the packing, either at the bottom of the packing or at any intermediate level where there is an interruption of the continuous structure. Moreover, the vertical surface of supporting members may be used for drainage, provided they make contact at a large number of points all over the lower surface of the pattern, and do not block the vapour inlets. It will be appreciated that if the liquid were merely permitted to drip from the edges of the vapour perforations, this would materially reduce the capacity of the perforations for the passage of the vapour.

From these illustrative embodiments it will be observed that the invention provides a column of liquid-sealing capillary material arranged to provide a plurality of cells distributed throughout the column, providing for repeated subdivision and recombination of the liquid flowing along the material and sealing the mesh openings therein. The sealing of the mesh openings provides for control of the flow of vapour through the continuous though circuitous path through the vapour openings and the cells, and compels the vapour to remain in this path. The vapour passages afforded by the openings in the capillary material or provided by spacing or other arrangement of the material insures intimate mixing of the vapours.

It is not necessary that the several parts of the column structure be mechanically joined but there must be adequate contact so that the liquid will pass across such contacts as readily as along the mechanically continuous gauze. It will be observed, however, that greatest capacity and efficiency are obtained when the gauze is continuous throughout the structure, preferably with some such pattern as is illustrated in Figures 1 and 2. The cellular pattern on the gauze material adds to its mechanical strength which for many purposes is adequate. Where it is desirable or necessary to use a capillary material having insufficient strength to sustain the column other supporting means is required, as illustrated in Figures 5 to 8.

Since at each contact between the material of the column the liquid is mixed and re-distributed, the exactly uniform initial distribution of the liquid on the packing is not necessary, as the process will rapidly even out any inequalities in initial distribution.

The peculiar surface action of wetted gauze may be relied upon to maintain uniformity of liquid flow in small columns, and this would apply to any size of column if the dimensions of the pattern of the packing are mathematically exact. In larger columns, however, it may be advantageous to break the vertical continuity in order to insert between sections a device for re-distributing the liquid evenly throughout a large cross-section, and redistribution with the necessary drainage means, such as are illustrated in Figures 9 and 10, may be introduced to compensate for the cumulative effect of irregularities in the structure. In other cases, the vertical continuity may be broken for adding the "feed" uniformly over a portion of the packing, or heating or cooling means may be inserted, as in stripping or dephlegmating columns. But unless necessary such interruptions in the vertical continuity of the column structure are not desirable since they increase liquid hold-up and vertical height of the columns, without increased separation efficiency. The use of drainage means at the bottom of the column is always followed by increased capacity, since without such means there is a restriction of vapour flow.

In comparison with known packing the packing illustrated herein gives greatly increased efficiency. A bubble cap column normally requires about one foot or more of vertical height per theoretical plate of separation, whereas the present structure gives efficiencies of 15 to 30 theoretical plates per foot of height, and the rising vapour may attain speeds of two feet or more per second, calculated on the unobstructed column section, this value being at least three times that normally used. Thus the capacity factor of the packing (plates per foot $x$ capacity) is from 45 to 90 times that of a standard bubble cap column. Packed columns in use at present vary widely, but often show rather greater height efficiencies than the bubble cap types, sometimes reaching to about two plates per foot but in many cases not even reaching one plate per foot, and their vapour capacity is roughly speaking inversely proportional to their height effectiveness. Thus the packed column of known construction which shows two plates per foot will generally give a poor capacity, and vice versa, and their actual capacity factor rarely exceeds that of a bubble cap column.

In batch distillation, and if somewhat unstable liquids are being treated, the tie-up of liquid in the column is very important. In this respect the present structure is superior, as it holds up only about one-third as much liquid as a column of Raschig rings of the same effectiveness and about one-twentieth of that required for a bubble cap column.

As illustrative of the efficiency of this packing the following data may be given. A column consisting of nineteen sheets of gauze, as shown in Figures 1 and 2, will permit the continuous separation of benzene, 95% pure, from a mixture of 10% benzene and 90% toluene. For this separation about seven or eight bubble cap plates would be required, making an expensive column, seven or eight feet high, while the present column was only three inches high. If of the same diameter this structure would have decidedly greater capacity than the bubble cap column and would require much less liquid for its operation.

By means of one of these columns sixteen feet high the oxygen isotopes have been separated to the extent of 50% or more in one separation by the distillation of water under a partial vacuum at 2″ absolute pressure. Present data indicate that the forms of water being separated differ by only one-twentieth degree C. in boiling point, and it is found that the vapour in passing up through the packing reaches equilibrium with the descending liquid at a speed greater than 100 times per second, with a vapour velocity of 4 feet per second. Under these conditions it is found also that the total back pressure on the column, containing 1500 gauze elements, is only 4 mm. of mercury and that the column is equivalent to about 600 theoretical plates.

I claim:

1. Packing for fractionating columns and the like comprising a column of capillary material, the capillary openings of which seal with liquid under treatment, arranged to provide a multiplicity of cells uniformly distributed throughout the column, vapour passages through said capillary material larger than said capillary openings whereby each cell receives vapour from at least two other cells and uniformly disposed contact surfaces throughout the column to provide for repeated subdivision and recombination of liquid passing through the column.

2. Packing for fractionating columns and the like comprising capillary material, the capillary openings of which seal with liquid under treatment, arranged in a column, cells uniformly arranged in rows throughout the structure, the cells of one row being staggered with respect to those of an adjacent row, contacts between cell walls to provide mixing and redistribution at all such points of liquid flowing in the column and vapour passages larger than said capillary openings to and from each cell whereby each cell receives vapour from at least two other cells.

3. Packing of the character described comprising gauze, the mesh openings of which seal with liquid being treated, arranged in a column, the gauze being provided with a regular pattern of indentations, said indentations providing a multiplicity of contacts between constituent portions of the gauze forming the column and a regularly disposed series of openings throughout the structure for the passage of vapour through the column in tortuous paths in which the vapour is repeatedly subdivided and recombined.

4. Packing of the character described comprising metal gauze, the mesh openings of which seal with liquid under treatment, pyramidal indentations arranged in rows in said gauze, the pyramids in each row being staggered with respect to those in adjacent rows and vapour passages arranged in rows in said gauze, the passages in each row being staggered with respect to those in adjacent rows, a plurality of sheets of said gauze being arranged in a column, the interconnecting wall portions of adjacent pyramids providing numerous contacts between adjacent sheets and forming cells in successive horizontal sections of the column for intimate intermingling of vapour entering said cells through said passages.

5. Packing of the character described comprising sheets of gauze arranged in a column, each sheet having a regular pattern of integral raised portions throughout its surface forming in the column a multiplicity of interconnected cells, and regularly disposed perforations, larger than the mesh openings, to provide in the column vapour passages to and from each cell.

6. Packing as defined in claim 5 having drainage means contacting the base of the packing.

7. Packing of the character described comprising sheets of capillary material, provided with capillary openings through its substance of a size such that they seal with liquid under treatment and through which this liquid has free access, arranged in a column, a multiplicity of cells regularly disposed throughout said column in staggered relation and vapour openings regularly disposed in each sheet and disposed through the column to cause vapour travel laterally in said cells as well as upwardly in the column.

8. In packing for fractionating columns and the like, capillary material, the mesh openings of which seal with the liquid under treatment and through which this liquid has free access, indentations on the material forming contacts between successive portions thereof and a series of openings through the material larger than the mesh openings for the passage of vapour through the packing, the assembled material constituting a continuous structure subdivided into a multiplicity of cells interconnected by said vapour openings.

9. In packing of the character described, capillary material, provided with capillary openings through its substance of a size such that they seal with liquid under treatment and through which this liquid has free access, regularly disposed to form a multiplicity of cells interconnected by vapour openings through the sealed capillary material and successive portions of said material having bearing contact for the conduct of liquid over the surface of the material, said contacts being staggered vertically throughout the packing.

10. Packing for fractionating columns comprising capillary sheet material, the capillary openings of which seal with liquid under treatment, arranged in a column and dividing the entire volume in the body of the column into a series of uniformly shaped and regularly disposed enclosed cells, openings, smaller than the diameter of a cell but larger than will seal with liquid, in the capillary material constituting the walls of said cells, said openings connecting each cell with at least two lower and two higher cells and the enclosure of each of said cells being formed by line contact between adjacent elements of said capillary sheet material.

11. Packing as defined in claim 10 wherein said enclosed cells are arranged in rows and the cells of one row are staggered with respect to those of adjacent rows.

DONALD FRANK STEDMAN.